United States Patent [19]
Manfredi

[11] 3,956,111
[45] May 11, 1976

[54] ELECTRO-MAGNETIC ROAD HAZARD ELIMINATOR FOR VEHICLES

[76] Inventor: Arthur F. Manfredi, 2158 Beverly Road, Brooklyn, N.Y. 11226

[22] Filed: Oct. 18, 1974

[21] Appl. No.: 515,813

[52] U.S. Cl. ............................ 209/215; 209/223 R; 280/154.5 R
[51] Int. Cl.² ........................................ B03C 1/30
[58] Field of Search .......... 209/215, 222 R; 15/1 R, 15/54; 280/154.5 R, 160; 214/450

[56] References Cited
UNITED STATES PATENTS

| | | | |
|---|---|---|---|
| 262,790 | 8/1882 | King | 209/223 R |
| 538,320 | 4/1895 | Carter | 209/223 R |
| 931,885 | 8/1909 | Powel | 209/215 X |
| 1,178,680 | 4/1916 | Rosenthal | 209/215 |
| 1,523,623 | 1/1925 | Altman | 209/215 |
| 1,759,687 | 5/1930 | Carter | 209/215 |
| 2,629,495 | 2/1953 | Smale | 209/215 |
| 2,759,604 | 8/1956 | Carpenter | 209/215 |
| 3,198,996 | 8/1965 | Vollprecht | 335/277 |
| 3,835,955 | 9/1974 | Markness | 209/310 X |

FOREIGN PATENTS OR APPLICATIONS

| | | | |
|---|---|---|---|
| 114,819 | 7/1925 | Switzerland | 280/160 |
| 457,970 | 7/1913 | France | 280/160 |

*Primary Examiner*—Robert Halper
*Attorney, Agent, or Firm*—Friedman & Goodman

[57] ABSTRACT

A road cleaning device adapted to be mounted in front of a vehicle's front tires to pick up magnetically attractable road hazards such as nails, screws, tacks, bolts, miscellaneous scraps of metal and the like, the device comprising an electro-magnetic element for picking up the magnetically attractable road hazards. A support member secures the electro-magnetic element to a front part of the vehicle which is disposed in front of the front tires. A cushioning material is disposed between the electro-magnetic element and the front part of the vehicle for dampening the sound of the road hazards striking the electro-magnetic element as the road hazards are being picked up by the electro-magnetic element. The support member permits the electro-magnetic element to be horizontally adjusted to a left or right position relative to a respective front tire and to be vertically adjusted to an up or down position relative to the front part of the vehicle. Additionally, the electro-magnetic element may be inclined or tilted relative to a stationary horizontal portion of the support member. Preferably, the electro-magnetic element and the cushioning material are disposed in an open box-like housing which is secured to the support member.

11 Claims, 9 Drawing Figures

U.S. Patent   May 11, 1976   Sheet 1 of 2   3,956,111
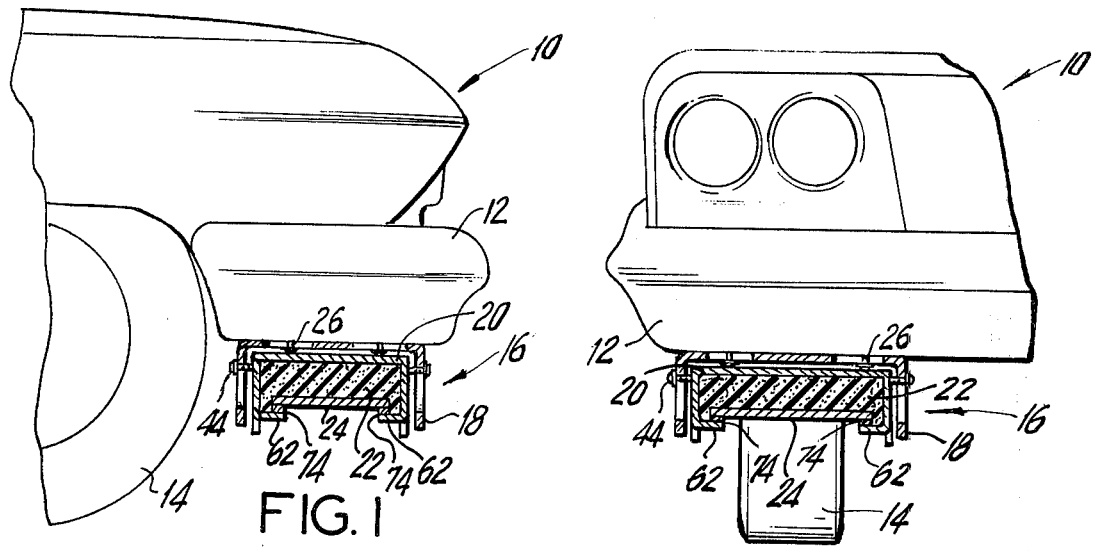
FIG. 1
FIG. 2
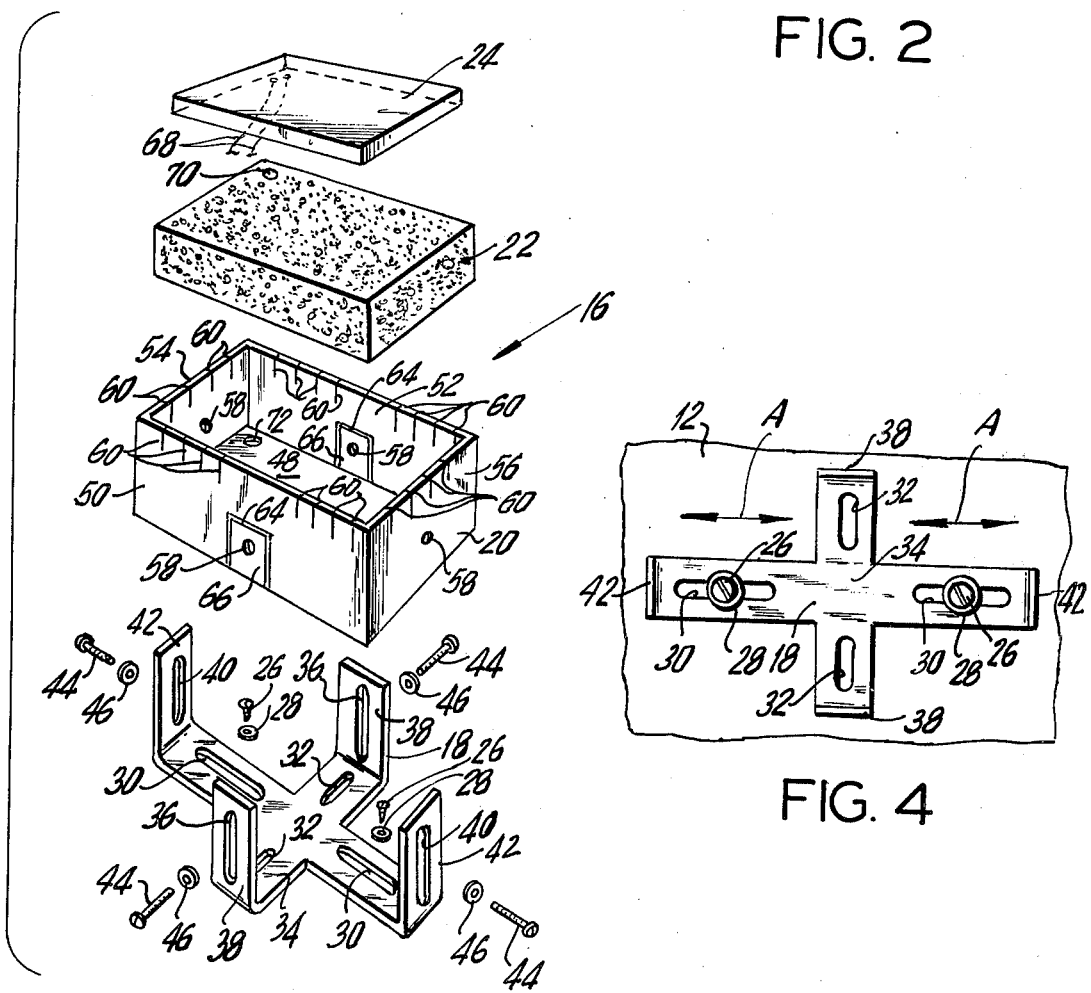
FIG. 3
FIG. 4

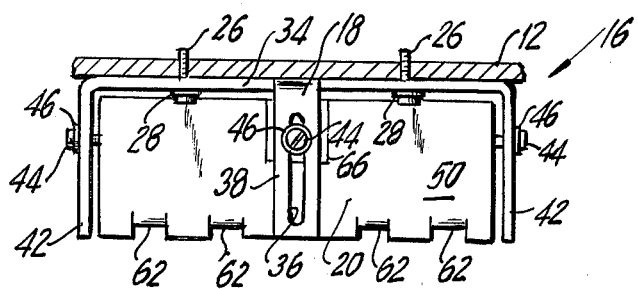
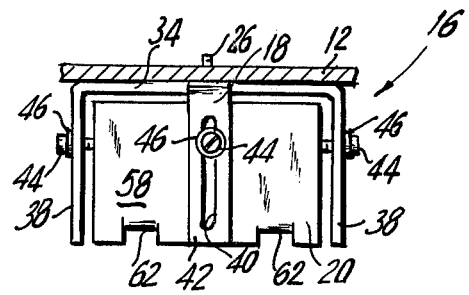
FIG.5  FIG.6
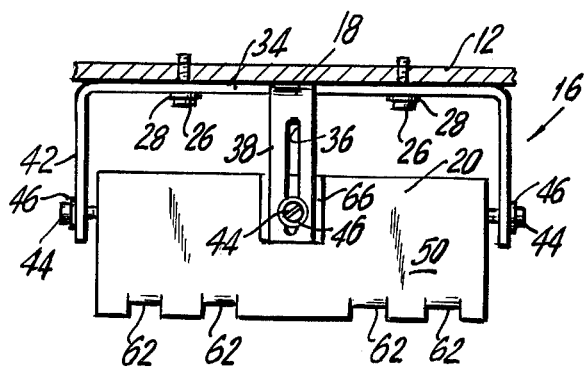
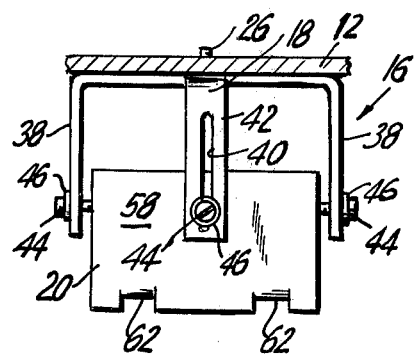
FIG. 7  FIG.8
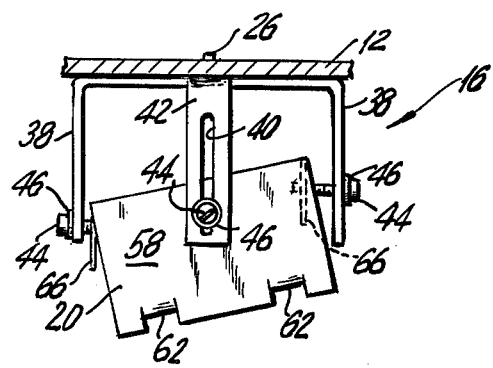
FIG. 9

ELECTRO-MAGNETIC ROAD HAZARD ELIMINATOR FOR VEHICLES

BACKGROUND OF THE INVENTION

The present invention relates to a road cleaning device, and more particularly to an electro-magnetic device adapted to be mounted in front of a vehicle's front tires to pick up magnetically attractable road hazards such as nails, screws, tacks, bolts, miscellaneous scraps of metal and the like.

The majority of tire-damaging objects are made of magnetically attractable materials which can be picked up with a suitable electro-magnetic device. These tire-damaging objects often cause either leaks or blow-outs to pneumatic tires. Tire punctures, particularly at high speed, usually cause loss of vehicle control, and can result in damage to the vehicle or other property, accidents, injury and even death. Furthermore, even if the driver is fortunate enough to safely steer the vehicle off the roadway, changing the punctured tire on a highway is considered to be dangerous.

Previous magnetic pick-up devices have left much to be desired. Usually, the pick-up device of the prior art is mounted either between the front and rear wheels, or behind the rear wheels. Thus, the front wheels of the vehicle, by far the most important from a vehicle-control stand point, were left susceptible to the very objects which are to be picked up. Other known pick-up devices require large bulky structures and separate electrical generators, where these structures are judged to be clumsy to operate and not commercially feasible. Still other known pick-up devices teach the pushing of wheeled magnets in front of the vehicle, thereby exposing the protective device to the road hazards, not to mention the added complexity of such a device. Accordingly, none of the prior art discloses a simple and efficient electro-magnetic road hazard eliminator for a vehicle, which can be easily mounted and maintained.

SUMMARY OF THE INVENTION

This invention relates to a road cleaning device adapted to be mounted in front of a vehicle's front tires to pick up magnetically attractable road hazards such as nails, screws, tacks, bolts and miscellaneous scraps of metal and the like, the device comprising electro-magnetic means for picking up the magnetically attractable road hazards, support means for securing the electro-magnetic means to a front part of the vehicle which is disposed in front of the front tires, and cushioning means disposed between the electro-magnetic means and the front part of the vehicle for dampening the sound of the road hazards striking the electro-magnetic means as the road hazards are picked up by the electro-magnetic means. Preferably, the support means permit the electro-magnetic means to be adjustable relative to the front part of the vehicle and with respect to the vehicle's front tires, so that the electro-magnetic means can be horizontally moved between a right position and a left position with respect to each of the front tires, and vertically moved between an upper position and lower position relative to the front part of the vehicle, in addition to being able to be inclined or tilted relative to the front part of the vehicle. In a preferred embodiment, the electro-magnetic means and the cushioning means are disposed in an open box-like housing which is secured to the support means.

Accordingly, an object of the present invention is to provide a road cleaning device mountable on a vehicle which overcomes the disadvantages of the prior art.

Another object of this invention is to provide a pick-up device as mentioned above which is simple in structure and can easily be installed and operated.

A further object of this invention is to provide a pick-up device as mentioned above, which is relatively inexpensive to manufacture and operate, and can be made available as an accessory to vehicles already in service on the road, as well as being a factory option for new vehicles.

A still further object of the present invention is to provide a road cleaning device comprising an electro-magnetic element which can easily be adjusted relative to a front part of the vehicle and the vehicle's front tires, so that the electro-magnetic element can be disposed between an up or down position, between a right or left position, and additionally be disposed in an inclined or tilted position.

Yet another object of the present invention is to provide a cushioning material between the above-mentioned electro-magnetic element and the front part of the vehicle for dampening the sound of the road hazards as the road hazards strike the electro-magnetic element.

An added object of this invention is to provide an electro-magnetic road hazard eliminating comprising an open box-like housing for accomodating the electro-magnetic element and cushioning material therein, which housing is secured to the support member for connecting the housing to the front part of the vehicle which is disposed in front of the front tires.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 represents a fragmented side elevational view of a vehicle's front portion, showing a side sectional view of an electro-magnetic road hazard eliminator pursuant to the present invention;

FIG. 2 represents a fragmented front elevational view of the vehicle of FIG. 1, showing a front sectional view of the electro-magnetic road hazard eliminator;

FIG. 3 represents an up-side-down exploded perspective view of the road hazard eliminator;

FIG. 4 represents a fragmented bottom plan view, showing the support member of the road hazard eliminator secured to the vehicle;

FIG. 5 represents a front elevational view of the road hazard eliminator, shown in a raised position and connected to a fragmented section of the vehicle;

FIG. 6 is a side elevational view of the road hazard eliminator shown in FIG. 5;

FIG. 7 represents a front elevational view of the road hazard eliminator, shown in a lowered position and connected to a fragmented section of the vehicle;

FIG. 8 represents a side elevational view of the road hazard eliminator shown in FIG. 7; and FIG. 9 represents a side elevational view of the road hazard eliminator, shown in a tilted or inclined position and connected to a fragmented section of the vehicle.

DESCRIPTION OF THE PREFERRED EMBODIMENT

Referring to the drawings, FIGS. 1 and 2 illustrate the front end of a conventional automobile 10 having a front bumper 12 and conventional tires 14. A road hazard eliminator or device 16 is connected to one end portion of the bumper 12, the device 16 being shown in cross-section. It is understood that another device 16 (not shown) is connected to the opposite end portion (not shown) of the bumper 12.

As best shown in FIG. 3, the device 16 illustrated in an inverted position for clarity thereof, comprises a bracket or support member 18, a housing 20, a cushioning material 22 and a conventional electro-magnet plate 24. Conventional bolts 26 and washers 28 are used to connect the support member 18 to the front bumper 12, through either pair of slots or openings 30, 32 formed in the base portion 34 of the support member 18. As shown, the base portion 34 includes a crossed member having elements disposed at right angles to each other, with the longitudinal set of elements being longer than the other transverse set. The slots 30 are formed in the longer elements and extend perpendicularly to the slots 32 which are formed in the shorter elements.

A leg member extends perpendicularly vertically outwardly away from the ends of each of the four elements of the horizontally disposed base portion 34, with each of the four leg members being of equal length. Longitudinally extending vertical slots 36 are provided in the front and rear leg members 38, with the longitudinally extending vertical slots 40 being provided in the side leg members 42. Conventional bolts 44 and wahsers 46 are associated with the slots 36, 40 as will be set forth hereinafter below in more details.

The housing 20 defines an open rectangular box-like receptacle having a bottom wall 48, a front wall 50, a rear wall 52 and side walls 54 and 56. Each of the upstanding walls 50–56 is provided with a centrally located threaded opening or hole 58. The upper edge of the housing 20 around the exposed periphery thereof, is provided with slots or cuts 60 therethrough, to enable a series of tabs 62 to be formed therefrom as will be set forth in more detail hereinafter below. Additionally, the front and rear walls 50, 52 are each provided with a U-shaped cut or slot 64 around the threaded holes 58 to provide hinged tabs 66, which will also be discussed below.

The cushioning material 22 may be fabricated from any known, commercially available material which is nonelectrically conductive, such as rubber which may be either hard rubber or sponge rubber as required to provide the proper dampening effect. Preferably, the cushioning material is rectangularly shaped to fit within the housing 20 in a snug or tight relationship therein.

The electro-magnet 24 is of a conventional type, where the details of the specific internal structure of the electro-magnet is well known and therefore not thought necessary to be set forth herein. For example, reference may be made to U.S. Pat. No. 1,745,970, granted Feb. 4, 1930 to H. R. Andrew, which discloses a similar electro-magnet having an internal magnetic core wound with suitable wire. The electro-magnet 24 has a flat rectangular configuration which is receivable in the housing 20. The electro-magnet plate 24 has conventional lead wires 68 extending therefrom in a conventional manner. The lead wires 68 are adapted to pass through a hole 70 formed through the cushioning material 22, and also pass through an opening 72 provided through the bottom wall 48 of the housing 20.

In assembling the device 16, the cushioning material 22 is placed into the housing 20 so that the cushioning material 22 is disposed against the bottom wall 48. The electro-magnet plate 24 is placed upon the cushioning material 22 with the lead wires 68 being drawn through the openings 70 and 72 in the cushioning material and housing, respectfully. An insulated material 74, shown in FIGS. 1 and 2, is disposed around the outer exposed periphery of the electro-magnet plate 24. The cut edges of the housing 20 are then bent or folded inwardly to form the tabs 62 to hold and secure the plate and cushioning material within the housing. The insulating material 74 is being disposed between the electro-magnet plate 24 and the tabs 62 so that there is no electrical contact between the electro-magnet 24 and the housing 20 which is preferably formed from a suitable metal. However, it should be understood, that if the housing 20 is formed from a non-electrical conductive material, such as plastic, there is no need to use the insulating material 74.

At this point of the discussion, it is noted that the device 16 now comprises two major components, one being the combination of the housing 20, the cushioning material 22 and the electro-magnet plate 24, with the other component being the support member 18. The manner of securing the device 16 to the vehicle 10 will now be discussed in detail.

As shown in FIG. 4, the support member 18 is connected to the bumper 12 by passing the bolts 26 with the washers 28 thereon, through the slots 30 and into threaded openings which have previously been made in the bumper 12. It is understood, that the support member 18 may just as well be connected to a bottom part of the automobile's fender, if such a fender part is convenient, where the additional slots 32 of the support member 18 may be used if required.

It is further noted, that the length of the device 16 (particularly the distance between side walls 54 and 56) is made longer than the width of the conventional tire in order to provide protection to the tire even when the vehicle is turning. The slots 30 permit the support member 18 to be adjusted horizontally between a right position and a left position relative to the tire, where it is understood that there is at least one device 16 for each of the front tires 14 of the vehicle 10. The slots 32, if used alone, allow front and rear adjustment. After the position of the support member 18 has been determined, the bolts 26 are tightened to fasten the support member 18 in the selected horizontal position.

As shown in FIGS. 5 and 6 of the assembled housing 20 is positioned between the leg members 38, 42. The bolts 44, with the washers thereon, are inserted through the slots 36, 40 for engagement in the threaded openings 58. If the raised position of the device 16 as shown in FIGS. 5 and 6 is desired, the bolts 44 are tightened to secure the housing assembly 20 relative to the support member 18. However, the vertical position of the device 16 is adjustable between the raised position shown in FIGS. 5 and 6 and the lower position shown in FIGS. 7 and 8. Accordingly, the housing assembly 20 is vertically moved to the desired position before the bolts 44 are tightened to obtain the desired height necessary for achieving the required magnetic attraction for picking up the road hazards. Accordingly, the length of the leg members 38, 42 may be lengthened or shortened in the manufacture thereof, depending upon the amount of vertical adjustment required between different types of vehicles.

FIG. 9 illustrates another feature of the present invention, which allows the housing assembly 20 to be inclined or tilted relative to the support member 18 which is fastened to the front part of the vehicle. With the bolts 44 not completely tightened in the threaded openings 58, the housing 20 is tilted so that the front wall 50 is higher than the rear wall 52, the rear wall 52 being closer to the front tire 14. Accordingly, during the tilting, the tabs 66 are pivoted relative to the front and rear walls 50, 52 so that the tabs 66 remain hinged to the walls 50, 52 and parallel to the leg members 38. As shown, the front tab 66 is forced into the housing 20, thereby displacing the cushioning material 22 therein which permits such displacement, with the rear tab 66 being pivoted away from the rear wall 52. Accordingly, once the desired tilted position is obtained, the bolts 44 are tightened to secure the housing assembly 20 relative to the support member 18 and the bumper 12.

It is noted, that the above-mentioned adjustments could be modified so that these adjustments are power-controlled, such as by conventional solenoids or vacuum from the vehicle's engine, with conventional springs providing a restoring force to bring the housing 20 back to its original position, wherein other types of conventional adjustment means are also possible.

Preferably, the lead tires 68 are connected to the vehicle's alternator (not shown) in a conventional manner to supply power to the electro-magnet 24. This connection eliminates the need for a separate power supply, a greatly simplifies the installation, operation and maintenance of the device 16. This connection is also made in order not to drain the vehicle's battery (not shown); the power to the device 16 is only available when the ignition switch (not shown) is in an "on" position, which activates the vehicle's alternator.

Accordingly, objects which are picked up and collected during a trip or movement of the vehicle may conveniently be disposed of whenever the vehicle is stopped. These objects are released from the device 16 by merely cutting off the vehicle's ignition, thereby deactivating the alternator and cutting off the power to the electro-magnet 24. Additionally, the power to the electro-magnet 24 can be conveniently controlled with a simple on-off switch (not shown), which would be accessible to the vehicle operator. For example, this switch can be mounted on the dashboard (not shown) of the automobile in a conventional manner well known in the art.

Numerous alterations of the structure herein disclosed will suggest themselves to those skilled in the art, where it is clearly understood, that the present device finds application for all wheeled vehicles with pneumatic tires, including automobiles, trucks, buses, airplanes, etc. However, it is to be understood that the present disclosure relates to a preferred embodiment of the invention which is for purposes of illustration only and not to be construed as limitations of the invention.

What is claimed is:

1. A road cleaning device adapted to be mounted in front of the vehicle's front tires to pick up magnetically attractable road hazards such as nails, screws, tacks, bolts, miscellaneous scraps of metal and the like, said device comprising electro-magnetic means for picking up the magnetically attractable road hazards, supports means for securing said electro-magnetic means to a front part of the vehicle which is disposed in front of the front tires, cushioning means disposed between said electro-magnetic means and the front part of the vehicle for dampening sound of the road hazards striking said electro-magnetic means as said road hazards are picked up by said electro-magnetic means, said support means including a support member and an open box-like housing, said cushioning means and electro-magnetic means being disposed in said housing with a surface of said electro-magnetic means being exposed for picking up the road hazards, first fastening means for securing said support member to the front part of the vehicle, and second fastening means for securing said housing to said support member, said support member including slot means for receiving said first fastening means, said slot means allowing said electro-magnetic means to be horizontally adjusted between left and right positions relative to a respective one of the front tires.

2. A road cleaning device adapted to be mounted in front of the vehicle's front tires to pick up magnetically attractable road hazards such as nails, screws, tacks, bolts, miscellaneous scraps of metal and the like, said device comprising electro-magnetic means for picking up the magnetically attractable road hazards, support means for securing said electro-magnetic means to a front part of the vehicle which is disposed in front of the front tires, cushioning means disposed between said electro-magnetic means and the front part of the vehicle for dampening sound of the road hazards striking said electro-magnetic means as said road hazards are picked up by said electro-magnetic means, said support means including a support member and an open box-like housing, said cushioning means and electro-magnetic means being disposed in said housing with a surface of said electro-magnetic means being exposed for picking up the road hazards, first fastening means for securing said support member to the front part of the vehicle, and second fastening means for securing said housing to said support member, said support member including slot means for receiving said second fastening means, said slot means allowing said electro-magnetic means to be vertically adjusted between raised and lowered positions relative to the front part of the vehicle.

3. A road cleaning device as claimed in claim 2, wherein said housing includes hinged tab means for receiving said second fastening means, said tab means allowing said electro-magnetic means to be adjusted between horizontal and inclined positions relative to the front part of the vehicle.

4. A road cleaning device as claimed in claim 2, wherein said support member includes horizontal slot means for receiving said first fastening means, said horizontal slot means allowing said electro-magnetic means to be horizontally adjusted between left and right positions relative to a respective one of the front tires.

5. A road cleaning device for mounting on a vehicle's front bumper in front of the vehicle's front tires to pick up magnetically attractable road hazards such as nails, screws, tacks, bolts, miscellaneous scraps of metal and the like, said device comprising electro-magnetic means for picking up the magnetically attractable road hazards, support means for securing in a stationary relationship said electro-magnetic means to a bottom portion of the front bumper which is disposed in front of the front tires, cushioning means disposed between said electro-magnetic means and the front part of the vehicle for dampening sound of the road hazards striking said electro-magnetic means as said road hazards are picked up by said electro-magnetic means, said cushioning means being disposed against said electro-magnetic means, said cushioning means being fabricated from a non-electrically conductive material, holding means for securing said electro-magnetic means against said cushioning means in a fixed relationship to each other, said support means including a support member and an open box-like housing, said cushioning means and electro-magnetic means being disposed in said housing with a surface of said electro-magnetic means being exposed for picking up the road hazards, first fastening means for securing said support member to the front bumper of the vehicle, and second fastening means for securing said housing to said support member.

6. A road cleaning device as claimed in claim 5, wherein said support means include adjustment means for allowing said electro-magnetic means to be horizontally adjusted between left and right positions relative to a respective one of the front tires before being stationarily secured.

7. A road cleaning device as claimed in claim 5, wherein said support means include adjustment means for allowing said electro-magnetic means to be vertically adjusted between raised and lowered positions relative to the front bumper of the vehicle before being stationarily secured.

8. A road cleaning device as claimed in claim 5, wherein said support means include adjustment means for allowing said electro-magnetic means to be adjusted between horizontal and inclined positions relative to the front bumper of the vehicle before being stationarily secured.

9. A road cleaning device as claimed in claim 5, wherein said support means include first, second and third adjustment means, said first adjustment means allowing said electro-magnetic means to be horizontally adjusted between left and right positions relative to a respective one of the front tires before being stationarily secured, said second adjustment means allowing said electro-magnetic means to be vertically adjusted between raised and lowered positions relative to the front bumper of the vehicle before being stationarily secured, and said third adjustment means allowing said electro-magnetic means to be adjusted between horizontal and inclined positions relative to the front bumper of the vehicle before being stationarily secured.

10. A road cleaning device as claimed in claim 5, wherein said holding means includes tab members disposed on said housing and bent inwardly for holding said electro-magnetic means within said housing.

11. A road cleaning device as claimed in claim 5, wherein said cushioning means has a rectangular configuration with a planar surface abutting against a planar surface of said electro-magnetic means.

* * * * *